US011538440B2

(12) United States Patent
Liu

(10) Patent No.: US 11,538,440 B2
(45) Date of Patent: Dec. 27, 2022

(54) METHOD AND APPARATUS FOR CONTROLLING BRIGHTNESS OF SCREEN WIDGET, AND STORAGE MEDIUM

(71) Applicant: BEIJING XIAOMI MOBILE SOFTWARE CO., LTD., Beijing (CN)

(72) Inventor: Weiguang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/331,277

(22) Filed: May 26, 2021

(65) Prior Publication Data

US 2022/0101811 A1 Mar. 31, 2022

(30) Foreign Application Priority Data

Sep. 29, 2020 (CN) ......................... 202011052142.4

(51) Int. Cl.

| | |
|---|---|
| ***G09G 5/10*** | (2006.01) |
| ***G06F 3/048*** | (2013.01) |
| ***H04N 5/57*** | (2006.01) |
| ***H04N 5/58*** | (2006.01) |
| ***H04N 9/67*** | (2006.01) |
| ***H04N 9/73*** | (2006.01) |
| ***H04N 9/77*** | (2006.01) |

(52) U.S. Cl.

CPC ....... *G09G 5/10* (2013.01); *G09G 2320/0606* (2013.01); *G09G 2320/0686* (2013.01); *G09G 2320/10* (2013.01); *G09G 2360/144* (2013.01)

(58) Field of Classification Search

CPC ............. G09G 5/10; G09G 2320/0606; G09G 2320/0686; G09G 2320/10; G09G 2360/144; G09G 5/14; G09G 3/36; G09G 3/32; G09G 2354/00; G06F 3/0481; G06F 3/0484; G06F 3/0487; H04N 5/57; H04N 5/58; H04N 9/67; H04N 9/73; H04N 9/77; H04N 9/74

See application file for complete search history.

(56) References Cited

U.S. PATENT DOCUMENTS

2010/0250984 A1 9/2010 Lee et al.
2015/0116344 A1* 4/2015 Won ......................... G09G 5/14 345/589
2016/0234468 A1* 8/2016 Hu ....................... H04N 9/3194

FOREIGN PATENT DOCUMENTS

EP 2869292 A2 5/2015

OTHER PUBLICATIONS

European Patent Application No. 21176728.0 extended Search and Opinion dated Dec. 2, 2021, 8 pages.

* cited by examiner

*Primary Examiner* — Wesner Sajous
(74) *Attorney, Agent, or Firm* — Lathrop GPM LLP

(57) ABSTRACT

Embodiments of the disclosure provide a method and an apparatus for controlling brightness of a screen widget, a terminal and a storage medium. The method includes: obtaining display data; determining a widget area of the screen widget based on the display data, in which the screen widget is configured to display multimedia information in a form of a small window on the display screen; and controlling a brightness of the widget area to be adjusted to a target brightness.

18 Claims, 6 Drawing Sheets

METHOD AND APPARATUS FOR CONTROLLING BRIGHTNESS OF SCREEN WIDGET, AND STORAGE MEDIUM

CROSS-REFERENCE TO RELATED APPLICATION

The present application claims priority to Chinese Patent Application No. 202011052142.4, filed on Sep. 29, 2020, the entire contents of which are incorporated herein by reference.

TECHNICAL FIELD

The disclosure relates to the field of terminals, and more particularly, to a method and an apparatus for controlling brightness of a screen widget, and a storage medium.

BACKGROUND

Many mobile phone users use mobile phones after lights out at night. In essence, they are using the mobile phone in a dark environment. Typically, under such circumstances, the mobile phone will enter a luminous screen mode, and the screen brightness is dimmed significantly, which is more comfortable for the eyes.

SUMMARY

Embodiments of the disclosure provide a method for controlling brightness of a screen widget, for a terminal with a display screen. In one embodiment, the method includes: obtaining display data; determining a widget area of the screen widget based on the display data, in which the screen widget is configured to display multimedia information in a form of a small window on the display screen; and adjusting brightness of the widget area to a target brightness level.

Embodiments of the disclosure provide an apparatus for controlling brightness of a screen widget, for a terminal with a display screen. In one embodiment, the apparatus includes: one or more processors; a memory storing instructions executable by the one or more processors; in which the one or more processors are configured to: obtain display data; determine a widget area of the screen widget based on the display data, in which the screen widget is configured to display multimedia information in a form of a small window on the display screen; adjust brightness of the widget area to a target brightness level.

According to embodiments of the present disclosure, a non-transitory computer-readable storage medium is provided. In one embodiment, the storage medium has stored therein instructions that, when executed by a processor of a terminal, causes the terminal to perform the method for controlling brightness of a screen widget according to the present disclosure. The method includes: obtaining display data; determining a widget area of the screen widget based on the display data, wherein in which the screen widget is configured to display multimedia information in a form of a small window on the display screen; and adjusting brightness of the widget area to a target brightness level.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

In the related art, if the user uses a screen widget with a small screen window, (such as a video widget), the content in the screen widget may be unclear. The user often needs to increase the screen brightness; however, if the brightness is increased for the full screen, it will cause more dazzling problems due to the high brightness.

Figure 1:
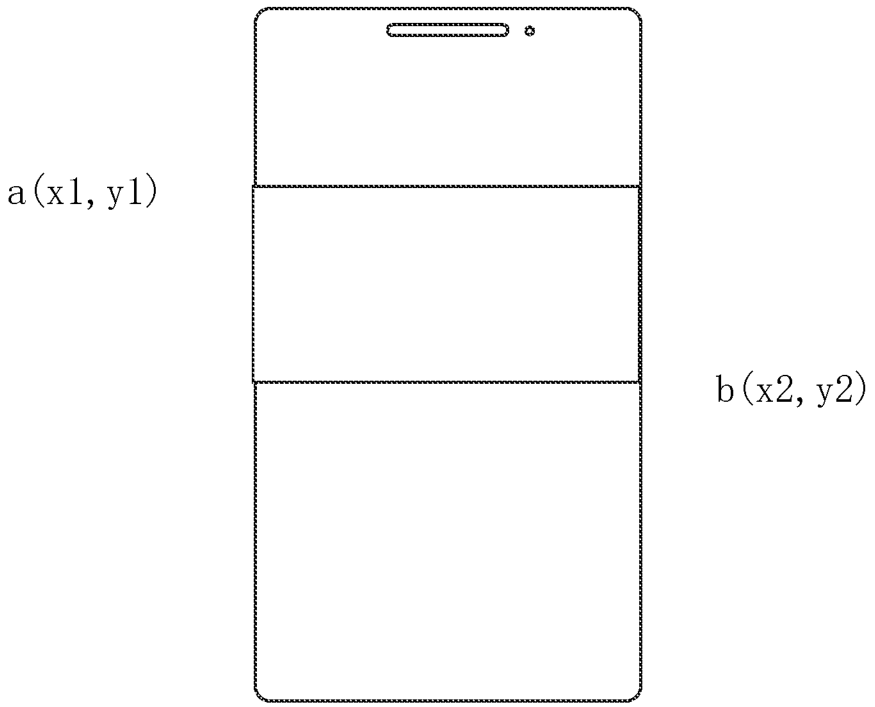
FIG. 1 is a schematic diagram of the principle of determining a screen widget in the related art.

Among the related technologies, local adjustment technologies such as partial display and partial highlighting of OLED displays have been mature and have been applied in practice. The realization method is as shown in FIG. 1. The main control chip (AP) will specify in advance the coordinates of the starting point (point a) and the end point (point b) of the area to be adjusted partially and notify the same to the display driver chip (DDIC). At the same time, the DDIC will also be notified of the adjustment operations that need to be performed, for example, the brightness of the area needs to be adjusted to a high level, DDIC will increase the drive current of all pixels in this area to achieve the purpose of increasing the brightness of this area. In other words, the position of the video window in the related art is relatively fixed, and the brightness of the video widget can be adjusted only when it is displayed at a preset position. As the position of the video widget moves, when it leaves the preset position, the brightness of the video widget cannot be adjusted.

Therefore, in the above scheme, the main control chip of the mobile phone must specify the start and end points of the area that needs to be adjusted, that is, the start and end points must be preset in advance, which makes the scheme unable to realize real-time and automatic adjustment of the area that needs to be adjusted partially.

The present disclosure provides a method for controlling the brightness of a screen widget. In the method for controlling the brightness of a screen widget, the widget area of the screen widget is automatically determined according to the display data, and then the brightness of the widget area is adjusted to realize the partial adjustment of the brightness of the display screen, so as to improve the user experience.

The technical solution provided by the embodiments of the present disclosure may include the following beneficial effects: In the method for controlling the brightness of the screen widget, the widget area of the screen widget is automatically determined according to the display data, and then the brightness of the widget area is adjusted to realize the display screen partial brightness adjustment to improve user experience.

Figure 2:
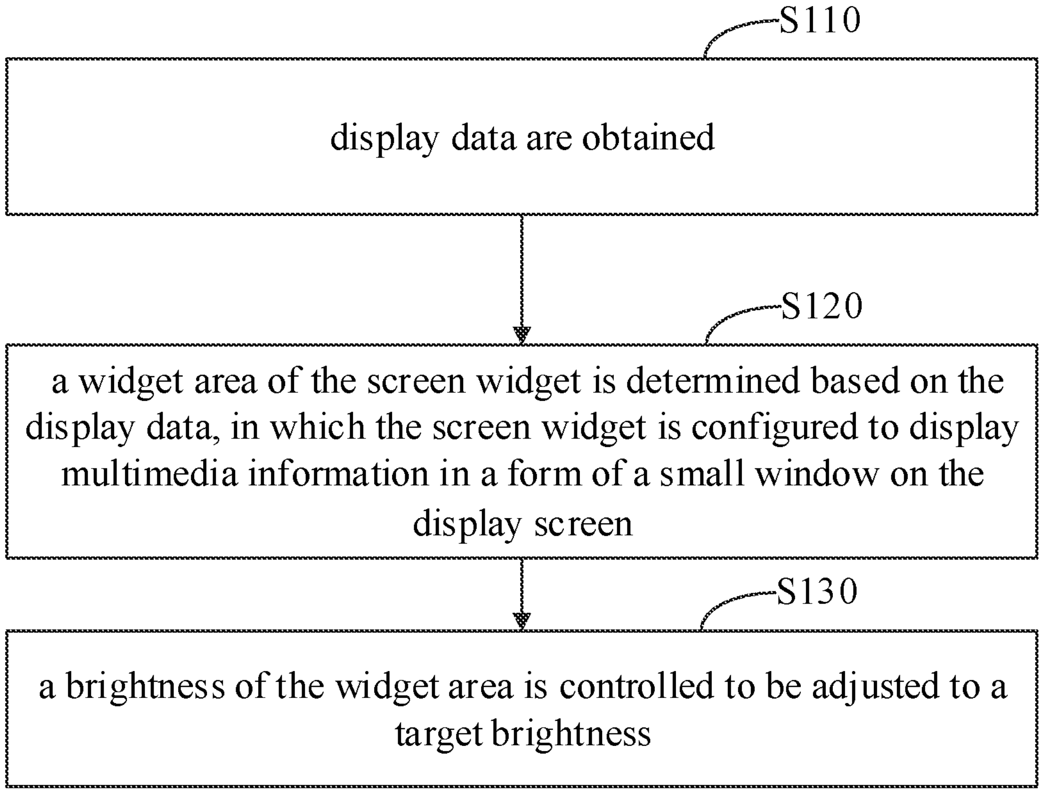
FIG. 2 is a flow chart showing a method for controlling brightness of a screen widget according to an exemplary embodiment.

In an exemplary embodiment, a method for controlling the brightness of a screen widget is provided, which is applied to a terminal with a display screen. As shown in FIG. 2, the method includes the following.

At block S110, display data are obtained.

The display screen relies on MIPI (Mobile Industry Processor Interface) transmission protocol for display. The refresh rate of the existing display screen is generally 60 Hz, that is, during the refresh process, the display screen is refreshed 60 times within one second, and the refresh time of each frame is 1/60 second. During the refresh process, the main control chip will transmit the display data to the display driver chip in a frame as the smallest unit through the MIPI transmission protocol, that is, within one frame, the display data of each sub-pixel of the display screen will be received by the display driver chip, that is, every frame, the display data of all sub-pixels in the display screen will be updated. After the display driver chip receives the display data, it will convert the data through the digital-to-analog converter (DAC) and transmit the corresponding voltage value to each sub-pixel point.

Generally, the picture displayed in the area around the screen widget in the display screen is quite different from the picture displayed in the screen widget. For example, the area around the video widget displays a white picture or a black picture. In the embodiment of the present disclosure, the widget area used to display the screen widget on the display screen can be determined according to the difference between the display data of the area where the screen widget is located and the display data of the surrounding area.

At block S120, a widget area of the screen widget is determined based on the display data, in which the screen widget is configured to display multimedia information in a form of a small window on the display screen.

The screen widget may be, for example, a video widget, a notification bar widget, or a floating window used to display notification messages. Generally, the display data of the area where the screen widget is located is different from the display data of other areas. Therefore, the widget area of the screen widget may be determined automatically according to the display data.

The multimedia information may include any multimedia information that can be displayed on the interface, such as a dynamic video or a static text interface.

At block S130, a brightness of the widget area is adjusted to a target brightness level.

After determining the widget area of the screen widget, the brightness of the widget area may be adjusted to realize the partial adjustment of the brightness of the display screen, thereby improving the user experience.

In an exemplary embodiment, a method for controlling brightness of a screen widget is provided. Referring to FIG. 2, the method further includes: after determining the widget area of the screen widget based on the display data, controlling a brightness of areas outside the widget area on the display screen to be remained unchanged.

In the method for controlling the brightness of the screen widget in the embodiments, only the brightness of the widget area where the screen widget is located can be adjusted, but the brightness of the area outside the widget area remains unchanged, which can realize an effect that the brightness of the screen widget may be adjusted to a higher level to clearly view the display content of the screen widget, while maintaining the original brightness of other areas, so that the user will not feel glare, and the user experience is improved.

In an exemplary embodiment, a method for controlling the brightness of a screen widget is provided. As shown in FIG. 2, in the method, controlling the brightness of the widget area to be adjusted to the target brightness includes at least one of the following manners:

In a first manner, the brightness of the widget area is adjusted to the target brightness level according to ambient light information of an environment where the terminal is located.

In the first manner, when the ambient light information of the environment in which the terminal is located is lower than the preset illuminance value, the brightness of the widget area is adjusted to the target brightness level to ensure that the user can clearly view the content of the widget area.

For example, the preset illuminance value is 100 Lux, and the preset brightness is 130 cd/m2. That is, when the ambient light information of the environment in which the terminal is located is lower than 100 Lux, it means that the terminal is in a relatively dark environment at this time, and the overall brightness of the display screen will be lowered. At this time, if the video widget is used to watch the video, the brightness of the video widget is needed to be adjusted to 130 cd/m2, such that users can watch the video clearly and user comfort can be improved.

In a second manner, the brightness of the widget area is adjusted to the target brightness level according to a first brightness adjustment instruction received by the display screen.

In the second manner, the brightness of the widget area is adjusted to the target brightness level according to the first brightness adjustment instruction received by a first preset area of the display screen.

After determining the widget area, the user can adjust the brightness of the widget area through the corresponding first brightness adjustment instruction. The first brightness adjustment instruction for adjusting the widget area is, for example, a single-click touch signal, a double-click touch signal, or a touch signal for setting a trajectory that acts on the first preset area, or a touch signal with a set trajectory. For example, the touch signal with a set trajectory may be a circular sliding touch signal, an L-shaped sliding touch signal, or a linear sliding touch signal. The first preset area is, for example, the widget area.

In one example, the first brightness adjustment instruction is a linear sliding touch signal acting on the widget area. When the touch signal is a sliding touch signal acting on the widget area in the first direction, the brightness of the widget area may be increased. When the touch signal is a sliding touch signal acting on the widget area in a direction opposite to the first direction, the brightness of the widget area is reduced.

After determining the widget area, the user can still adjust the brightness of the entire display screen through the corresponding second brightness adjustment instruction. The second brightness adjustment instruction used to adjust the brightness of the display screen is, for example, a single-click touch signal, a double-click touch signal, or a touch signal with a set trajectory which are acting on the second preset area, in which the touch signal with a set trajectory may be, for example, a circular sliding touch signal, an L-shaped sliding touch signal, or a linear sliding touch signal. The second area is, for example, an area outside the widget area in the display screen.

In one example, the second brightness adjustment instruction is a linear active touch signal acting on an area outside the widget area. When the touch signal is a sliding touch signal acting on an area outside the widget area in the first direction, the brightness of the display screen may be increased. When the touch signal is a sliding touch signal that acts on the area outside the widget area in a direction opposite to the first direction, the brightness of the display screen may be decreased.

Of course, after determining the widget area, the user may implement different brightness adjustments according to different adjustment instructions. For example, the first brightness adjustment command is used to adjust the brightness of the widget area, and the second brightness adjustment command is used to adjust the brightness of the entire display screen.

In one example, the first brightness adjustment instruction is a linear active touch signal acting on the widget area, and the second brightness adjustment instruction is a linear active touch signal acting on the area outside the widget area.

When the touch signal is a sliding touch signal acting on the widget area along the first direction, the brightness of the widget area is increased. When the touch signal is a sliding touch signal acting on the widget area in a direction opposite to the first direction, the brightness of the widget area is reduced. When the touch signal is a sliding touch signal in the first direction that acts on the area outside the widget area, the brightness of the display screen is increased. When the touch signal is a sliding touch signal acting on an area outside the widget area in a direction opposite to the first direction, the brightness of the display screen is reduced.

Figure 3:
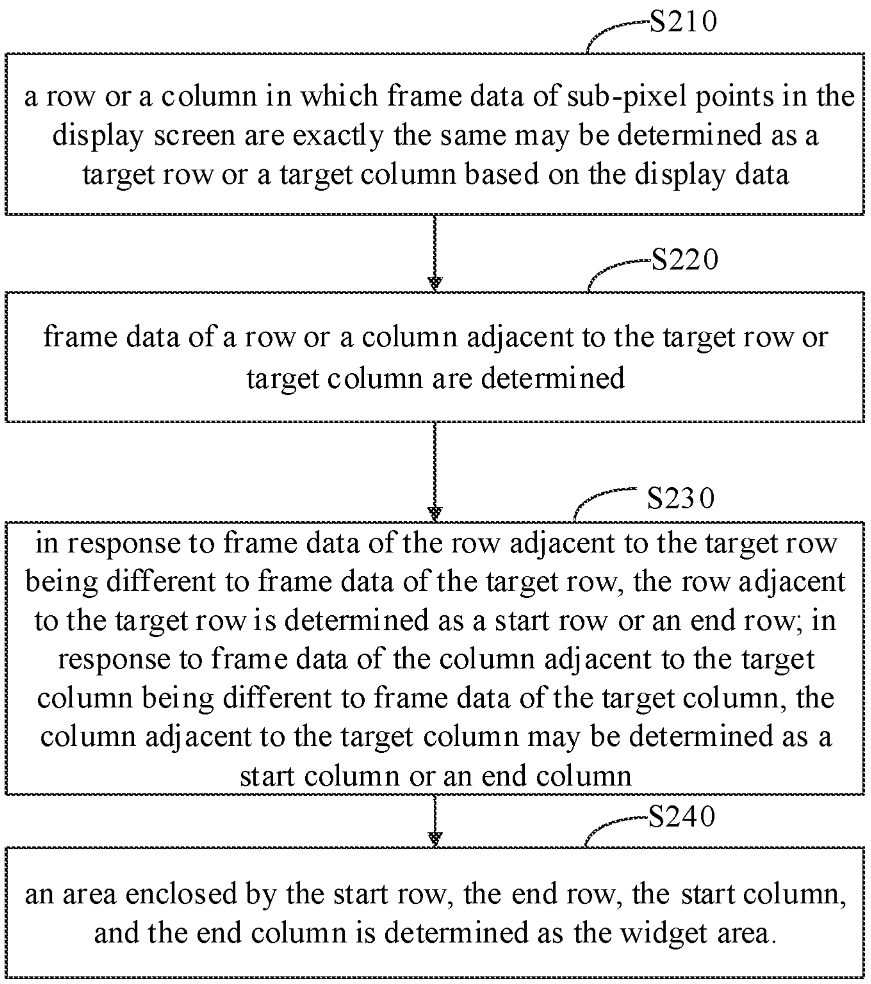
FIG. 3 is a flow chart showing a method for controlling brightness of a screen widget according to an exemplary embodiment.
Figure 4:
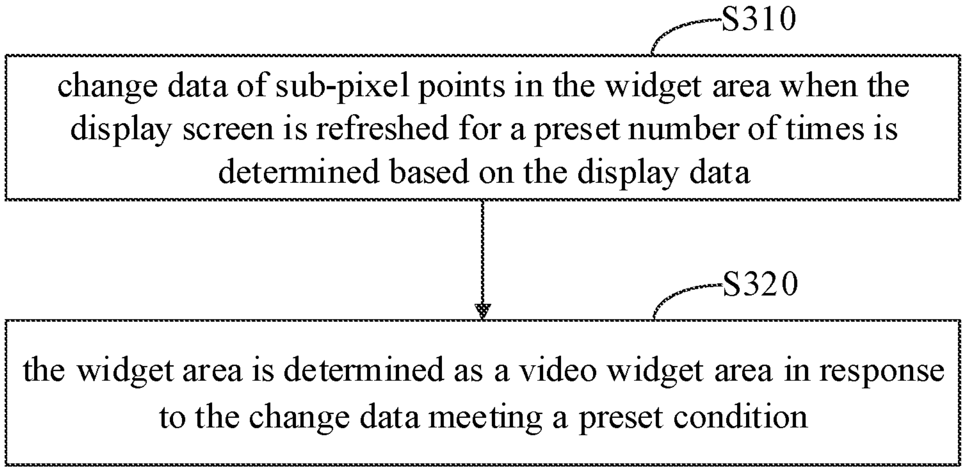
FIG. 4 is a flow chart showing a method for controlling brightness of a screen widget according to an exemplary embodiment.

In an exemplary embodiment, a method for controlling the brightness of a screen widget is provided. With reference to FIG. 3, in the method, determining the widget area of the screen widget based on the display data includes the following.

At block S210, a row or a column in which frame data of sub-pixel points in the display screen are exactly the same may be determined as a target row or a target column based on the display data.

Generally, the surrounding area of the screen widget displays pictures of the same color, for example, the surrounding area of the video widget is displayed in white or black. Therefore, if it is determined that the frame data of the sub-pixel points of a certain row or a certain column are exactly the same, it means that the row or the column is the row or column of the surrounding area of the screen widget, and the row or the column is determined as the target row or target column.

At block S220, frame data of a row or a column adjacent to the target row or target column are determined.

The surrounding area of the screen widget may have multiple rows or columns of sub-pixel frame data that are exactly the same. In order to better determine the widget area of the screen widget, it is necessary to determine the frame data of the adjacent row adjacent to the target row, and the frame data of the adjacent column adjacent to the target column, and which are then be determined based on the above frame data as an end row of the widget area, an end column of the widget area, and a start row of the widget area or a start column of the widget area.

At block S230, in response to frame data of the row adjacent to the target row being different to frame data of the target row, the row adjacent to the target row is determined as a start row or an end row; in response to frame data of the column adjacent to the target column being different to frame data of the target column, the column adjacent to the target column may be determined as a start column or an end column.

When the frame data of the adjacent line adjacent to the target line is different from the frame data of the target row, it means that the adjacent row is likely to be the start row or the end row of the widget area of the screen widget, so it is determined as a start row or an end line. When the frame data of the adjacent column adjacent to the target column is different from the frame data of the target column, it means that the adjacent column is likely to be the starting column or the ending column of the widget area, so it is determined as a starting column or an ending column.

At block S240, an area enclosed by the start row, the end row, the start column, and the end column is determined as the widget area.

Based on the above determined start row, end row, start column, and end column, the area enclosed by the start row, end row, start column, and end column may be determined. This area is likely to be the area where the screen widget is located, such that the area is determined as the widget area.

In an example, the screen widget is a video widget, and the area around the video widget used to play the video displays a white screen. The display data of all sub-pixels in the upper row area of the video widget are the same, the display data of all sub-pixels in the lower row area of the video widget are the same, the display data of all sub-pixels in the left column of the video widget are the same, and the display data of all sub-pixels in the right column of the video widget are the same. While the display data of the sub-pixels in each row and column of the video widget are basically not the same.

First, a row with the same frame data of the sub-pixel points is determined as a target row, and the column with the same frame data of the sub-pixel points is determined as a target column.

After that, the frame data of the adjacent row adjacent to the target row and the frame data of the adjacent column adjacent to the target column may be determined. When the frame data of the adjacent row adjacent to the target row is different from the frame data of the target row, the adjacent row is likely to be the start row or the end row of the video widget, so it is determined to be the start row or the end row. When the frame data of the adjacent column adjacent to the target column is different from the frame data of the target column, it means that the adjacent column is likely to be the start column or the end column of the video window, so it is determined as the start column or the end column.

Finally, the area enclosed by the start row, the end row, the start column, and the end column is determined as the widget area of the video screen.

In an exemplary embodiment, a method for controlling the brightness of a screen widget is provided. In this method, when the screen widget is a video widget, determining a widget area of the screen widget based on the display data includes:

At block S310, change data of sub-pixel points in the widget area when the display screen is refreshed for a preset number of times is determined based on the display data.

In this embodiment, a sub-pixel is a smaller unit that constitutes a pixel. Normally, a pixel is composed of three sub-pixels of R, G, and B. R refers to red, G refers to green, and B refers to blue.

In this step, the received display data is refresh data for the entire display screen, that is, regardless of whether the content displayed on the display screen is static content or dynamic content, each sub-pixel on the display screen will be updated based on each frame of data in received display data.

When a video widget is displayed on the display screen, and when the video widget plays a video, the display data of most of the content displayed in the video widget area where the video widget is located is constantly changing. The display data of the sub-pixels in the other areas of the display screen except the video widget area remain basically unchanged as the refreshing of the display screen. Therefore, based on the received display data, the change data of the sub-pixels in the widget area during the preset number of refreshes of the display screen may be determined, that is, during the preset number of refreshes before the current moment, such as 60 times before the current number of refreshes, the change data of the sub-pixels in the widget area may be determined. If the change data shows that the sub-pixels in the widget area change frequently, then the widget area is the video widget area. If the widget area shows that there is no change or almost no change in the sub-pixels, then the widget area may not be the video widget area.

When determining the change data, it may be in a process of refreshing the display screen for a preset number of times, when the data of two adjacent frames of each sub-pixel in the widget area are different, it is determined that the sub-pixel has changed once. For example, when the data of the second frame displayed by a certain sub-pixel is different from the data of the third frame, it is considered that the sub-pixel has changed once. If the data of the 10th frame of a certain sub-pixel is the same as the data of the 11th frame, and the data of the 11th frame is the same as the data of the 12th frame, it is considered that the sub-pixel has not changed. The change data includes the position information of each sub-pixel point in the widget area and the number of times the sub-pixel point changes.

In an example, the frame rate of the video source is 30 Hz, that is, 30 frames are refreshed per second. The refresh frequency of the display screen is 60 Hz, that is, the preset number of times in this step is 60 times, that is, the display screen is refreshed 60 times per second. Then, when the display screen is playing video, in order to ensure the display effect of the display screen, when sending display data to the display driver chip used to control the display of the display screen, every two frames correspond to one frame of the video source, which can also be understood as: when sending display data, two identical data frames are sent, and the data frame corresponds to a video frame. For example, the first data frame and the second data frame are the same and correspond to the first video frame; the third data frame and the fourth data frame are the same and correspond to the second video frame, and so on. Then, when the data of the second frame is inconsistent with the data of the third frame, it means that the sub-pixel has changed, that is, it has changed once.

According to the above method, it is possible to determine the change condition of each sub-pixel during the 60 refreshes (refreshing for 60 times) before the current number of refreshes, and then determine the position information of the sub-pixel in the widget area and the number of times the sub-pixel has changed.

It should be noted that when determining the change of each sub-pixel during the 60 refreshes before the current number of refreshes, the display data used to determine the sub-pixel conversion each time is 60 frames of display data.

For example, after acquiring the display data of the 60th frame, the change condition of each sub-pixel is determined according to the display data of the 1st frame to the 60th frame. When the display data of the second frame 62 is acquired, the display data of the first frame is discarded, and the change of each sub-pixel is determined according to the display data of the second frame to the 61st frame. Through this method, it can be ensured that when the position of the video widget area changes, the position of the video widget area can also be re-identified, and then the real-time position of the video widget area can be determined, and the user experience can be improved.

At block S320, the widget area is determined as a video widget area in response to the change data meeting a preset condition.

For example, when there is at least one target change row or target change column in the change data, the widget area is determined as the video widget area; the target change row or the target change column is a row or column in which the number of sub-pixels whose number of changes exceeds a preset threshold exceeds a preset percentage.

In an example, if there is a target change row in the change data of sub-pixel points in the widget area, it is determined that the widget area is a video widget area.

Of course, in order to improve the accuracy of the result, it can be set as follows: when there are multiple target change rows in the sub-pixel change data in the widget area, the widget area is determined to be the widget area of the video widget.

In an example, only when there are 50 or more target change row in the sub-pixel change data in the widget area, the widget area is determined to be the video widget area.

In an example, only when the number of target change rows in the sub-pixel change data in the widget area accounts for more than 60% of the total number of rows in the widget area, the widget area is determined to be the video widget area.

The preset threshold and the preset percentage may be factory settings of the terminal, or may be set by the user.

Figure 5:
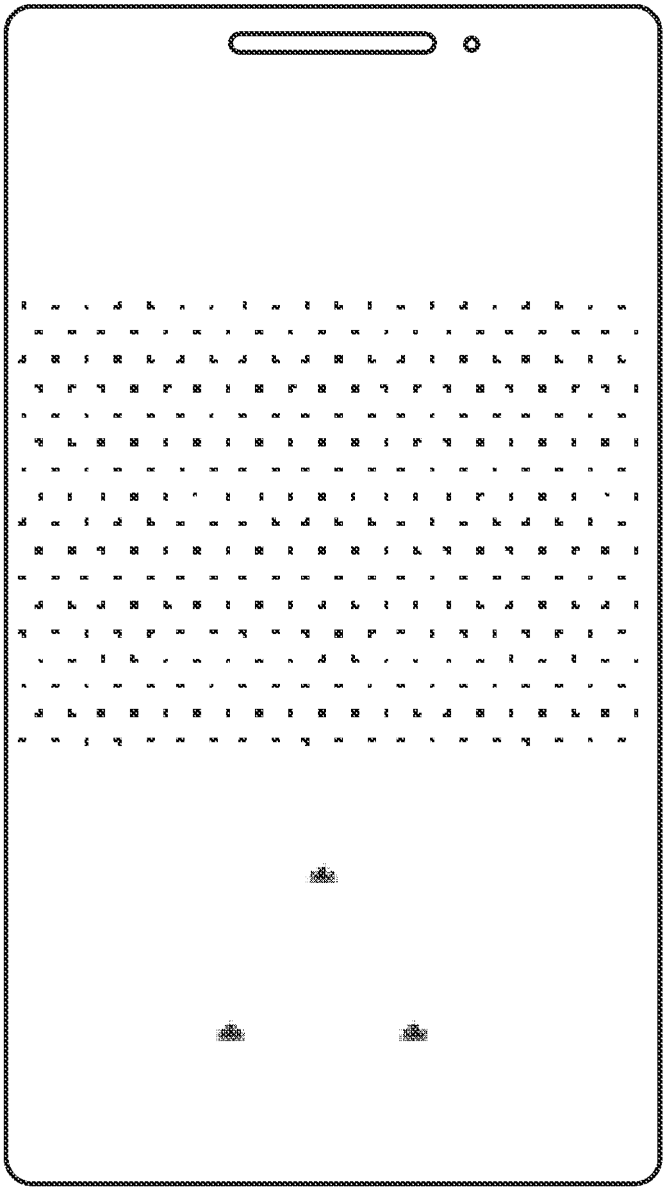
FIG. 5 is a schematic diagram showing the principle of determining a widget area according to an exemplary embodiment.

As shown in FIG. 5, the black dots in the figure represent the sub-pixels that have changed more than 10 times. It can be seen from the figure that some of the sub-pixels that have changed more than 10 times do not belong to the video widget area, so the preset percentage should be set.

In one example, the preset threshold is 10 times and the preset percentage is 50%.

In the change data, if a row in which the number of sub-pixel points whose number of changes exceeds 10 times accounts for 60% of the total number of sub-pixel pointes in this row, the row is determined as the target change row. If a row in which the number of sub-pixel points whose number of changes exceeds 10 times accounts for 40% of the total number of sub-pixel pointes in this row, the row is not the target change row.

Of course, it is understandable that the preset conditions in this step can be selected according to actual conditions. For example, the preset threshold may also be 20 times, the preset percentage may also be 60%, and so on. When the preset threshold and the preset percentage are larger, the judgment result is more accurate.

In the method for controlling the brightness of the screen widget, the video widget area is determined by automatically identifying an area displaying the video based on the display data of the sub-pixel points, and then the brightness of the video widget area is adjusted according to the ambient light information to achieve the partially adjustment of brightness of the display screen while maintaining the original brightness of other areas of the display screen. That is, the method can not only meet the requirement of adjusting the brightness of the video widget area to a higher brightness, but also maintain the original brightness of other areas, so that the user will not feel glare, thereby improving the user experience.

In an exemplary embodiment (this embodiment is not shown in the figure), a method for controlling the brightness of a screen widget is provided, and the method includes: determining whether a currently running application is stored in a configuration file; if yes, determining a target boundary area based on the received display data.

The application stored in the configuration file has a video playback function.

The configuration file is, for example, a whitelist file, and only when the currently running application belongs to the application in the whitelist file, the step of determining the target boundary area based on the received display data is performed.

In an example, the UI cloud control is used to set the black and white lists to identify the APP. The configuration file is a whitelist file, and the whitelist file includes iQiyi APP, Tencent Video APP, and WeChat APP.

Firstly, it is judged whether the currently running application belongs to the application in the whitelist file. If the currently running application belongs to the application in the whitelist file, the target boundary area in the display screen is determined based on the received display data.

For example, the current application is iQiyi APP, because it belongs to the application in the whitelist file, the target boundary area of the display screen is determined based on the received display data, and when the user is watching the video through the application, the corresponding video widget is determined to partially adjust the brightness.

For example, the current application is the calendar APP, because it is not an application summarized by the whitelist file, the target area of the display screen will not be determined based on the received display data, and the brightness cannot be partially adjusted.

In another example, the difference between this example and the above example is that it first determines whether the current application is playing a video. If the current application is playing a video, the step of determining whether the currently running application belongs to the application in the whitelist file is performed. If the current application does not play the video, the step of determining whether the currently running application belongs to the application in the whitelist file is not performed, and the brightness of the display screen cannot be partially adjusted.

Figure 6:
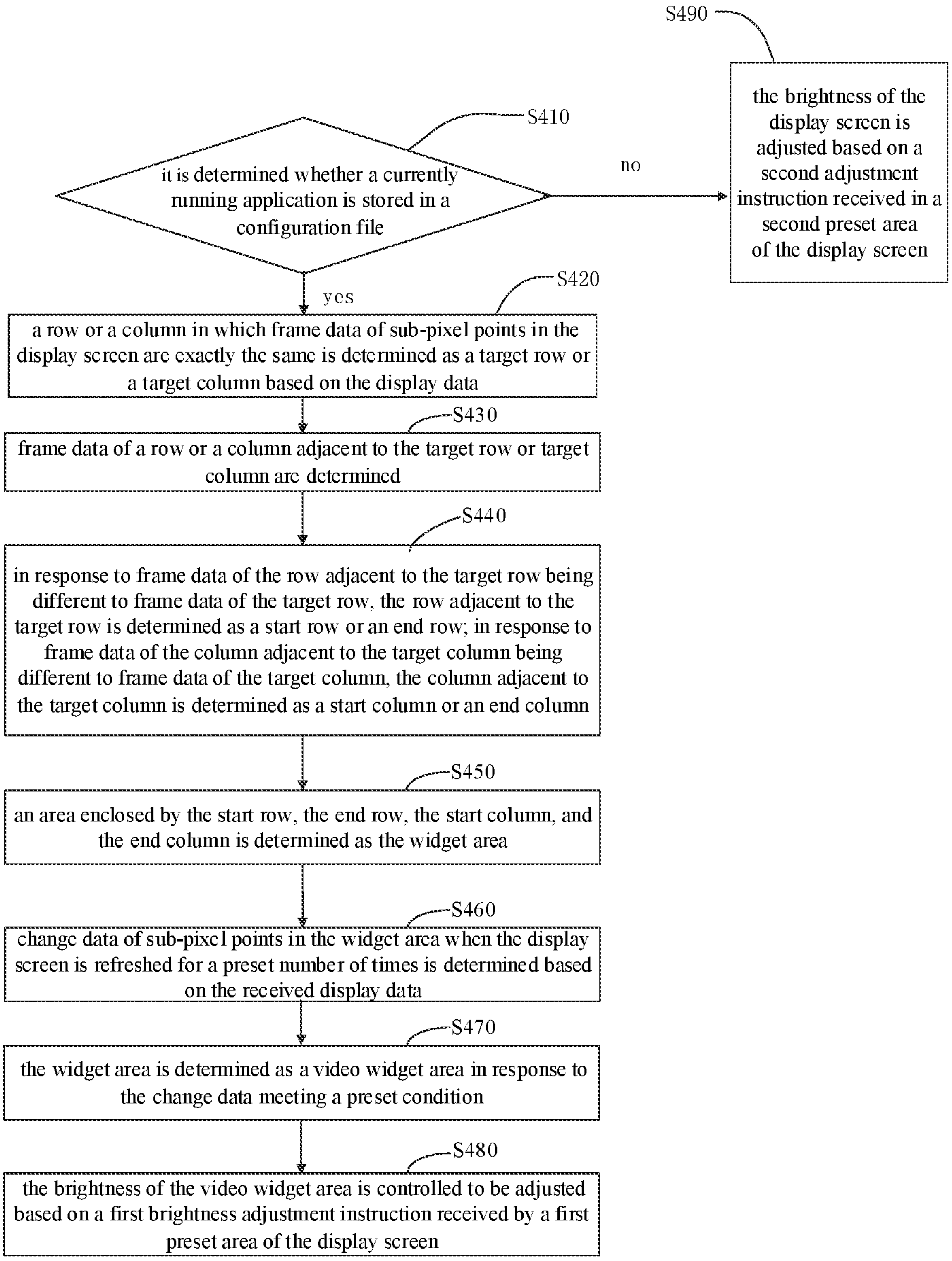
FIG. 6 is a flow chart showing a method for controlling brightness of a screen widget according to an exemplary embodiment.

In an exemplary embodiment, a method for controlling the brightness of a screen widget is provided. Referring to FIG. 6, the method includes the following.

At block S410, it is determined whether a currently running application is stored in a configuration file; if yes, go to step S420; if no, go to step 490.

At block S420, a row or a column in which frame data of sub-pixel points in the display screen are exactly the same is determined as a target row or a target column based on the display data.

At block S430, frame data of a row or a column adjacent to the target row or target column are determined.

At block S440, in response to frame data of the row adjacent to the target row being different to frame data of the target row, the row adjacent to the target row is determined as a start row or an end row; in response to frame data of the column adjacent to the target column being different to frame data of the target column, the column adjacent to the target column is determined as a start column or an end column.

At block S450, an area enclosed by the start row, the end row, the start column, and the end column is determined as the widget area.

At block S460, change data of sub-pixel points in the widget area when the display screen is refreshed for a preset number of times is determined based on the received display data.

At block S470, the widget area is determined as a video widget area in response to the change data meeting a preset condition.

At block S480, the brightness of the video widget area is controlled to be adjusted based on a first brightness adjustment instruction received by a first preset area of the display screen.

At block S490, the brightness of the display screen is adjusted based on a second adjustment instruction received in a second preset area of the display screen.

In the method for controlling the brightness of small windows on the screen, based on the display data of the sub-pixels, it is self-identified and determined whether there is a video widget area. If there is a video widget area in the display screen, the brightness of the display screen or the brightness of the video widget area may be adjusted based on different adjustment instructions received in different areas of the display screen. That is, the method can realize that only the partial brightness of the display screen is adjusted, thereby improving the user experience.

The present disclosure also proposes an apparatus for controlling brightness of a screen widget, which is used to implement the above method for controlling brightness of a screen widget.

Figure 7:
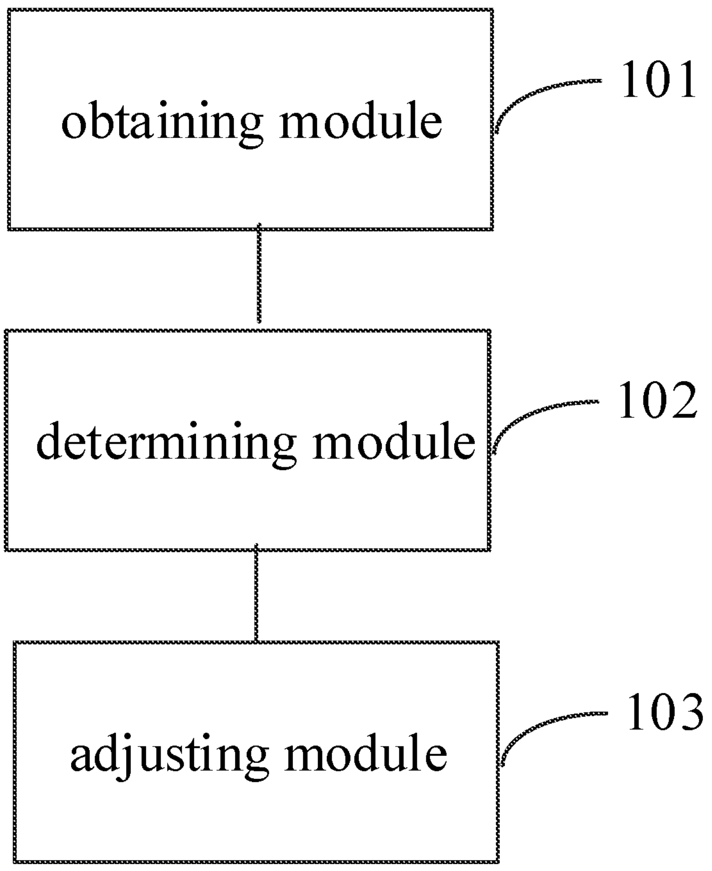
FIG. 7 is a block diagram of an apparatus for controlling brightness of a screen widget according to an exemplary embodiment.

In an exemplary embodiment, an apparatus for controlling brightness of a screen widget is provided. Referring to FIG. 7, the apparatus includes an obtaining module, a determining module and an adjusting module 103. The apparatus is used to implement the above method.

The obtaining module 101 is configured to obtain display data.

The determining module 102 is configured to determine a widget area of the screen widget based on the display data, in which the screen widget is configured to display multimedia information in a form of a small window on the display screen.

The adjusting module 103 is configured to control a brightness of the widget area to be adjusted to a target brightness.

In an exemplary embodiment, an apparatus for controlling brightness of a screen widget is provided. Referring to FIG. 7, the apparatus is improved based on the above apparatus. In the apparatus, the adjusting module 103 is further configured to: control a brightness of areas outside the widget area on the display screen to be remained unchanged.

In an exemplary embodiment, an apparatus for controlling brightness of a screen widget is provided. Referring to FIG. 7, the apparatus is improved based on the above apparatus. In the apparatus, the adjusting module 103 is further configured to: control the brightness of the widget area to be adjusted to the target brightness according to ambient light information of an environment where the terminal is located; and/or, control the brightness of the widget area to be adjusted to the target brightness according to a brightness adjustment instruction received by the display screen.

In an exemplary embodiment, an apparatus for controlling brightness of a screen widget is provided. Referring to FIG. 7, the apparatus is improved based on the above apparatus. In the apparatus, the adjusting module 103 is further configured to: adjust the brightness of the widget area to the target brightness in response to the ambient light information of the environment where the terminal is located being lower than a preset illuminance value.

In an exemplary embodiment, an apparatus for controlling brightness of a screen widget is provided. Referring to FIG. 7, the apparatus is improved based on the above apparatus. In the apparatus, the adjusting module 103 is further configured to: control the brightness of the widget area to be adjusted to the target brightness according to the brightness adjustment instruction received by a first preset area of the display screen.

In an exemplary embodiment, an apparatus for controlling brightness of a screen widget is provided. Referring to FIG. 7, the apparatus is improved based on the above apparatus. In the apparatus, the determining module 102 is further configured to: determine a row or a column in which frame data of sub-pixel points in the display screen are exactly the same as a target row or a target column based on the display data; determine frame data of a row or a column adjacent to the target row or target column; in response to frame data of the row adjacent to the target row being different to frame data of the target row, determine the row adjacent to the target row as a start row or an end row; in response to frame data of the column adjacent to the target column being different to frame data of the target column, determine the column adjacent to the target column as a start column or an end column; and determine an area enclosed by the start row, the end row, the start column, and the end column as the widget area.

In an exemplary embodiment, an apparatus for controlling brightness of a screen widget is provided. Referring to FIG. 7, the apparatus is improved based on the above apparatus. In the apparatus, when the screen widget is a video widget, the determining module 102 is configured to: determine, based on the display data, change data of sub-pixel points in the widget area when the display screen is refreshed for a preset number of times; and determine the widget area as a video widget area in response to the change data meeting a preset condition.

In an exemplary embodiment, an apparatus for controlling brightness of a screen widget is provided. Referring to FIG. 7, the apparatus is improved based on the above apparatus. In the apparatus, the determining module 102 is further configured to: determine the widget area as the video widget area in response to at least one target change row or target change column existed in the change data; in which, the target change row or the target change column is a row or column in which the number of sub-pixels whose number of changes exceeds a preset threshold exceeds a preset percentage.

In an exemplary embodiment, an apparatus for controlling brightness of a screen widget is provided. Referring to FIG. 7, the apparatus is improved based on the above apparatus. In the apparatus, the determining module 102 is further configured to: when the display screen is refreshed for the preset number of times, in response to data of two adjacent frames of each sub-pixel in the widget area being different, determine that the sub-pixel has changed; and determine position information of each sub-pixel point in the widget area and the number of times the sub-pixel point changes as the change data in case that the sub-pixel point changes.

In an exemplary embodiment, an apparatus for controlling brightness of a screen widget is provided. Referring to FIG. 7, the apparatus is improved based on the above apparatus. In the apparatus, the determining module 102 is further configured to: determine whether a currently running application is stored in a configuration file; in which, an application stored in the configuration file having a video playback function; determine the widget area as the video widget area based on the display data in response to the currently running application stored in the configuration file.

In an exemplary embodiment, a terminal is provided. The terminal may be a device with a display screen such as a mobile phone, a computer, a tablet device and the like.

Figure 8:
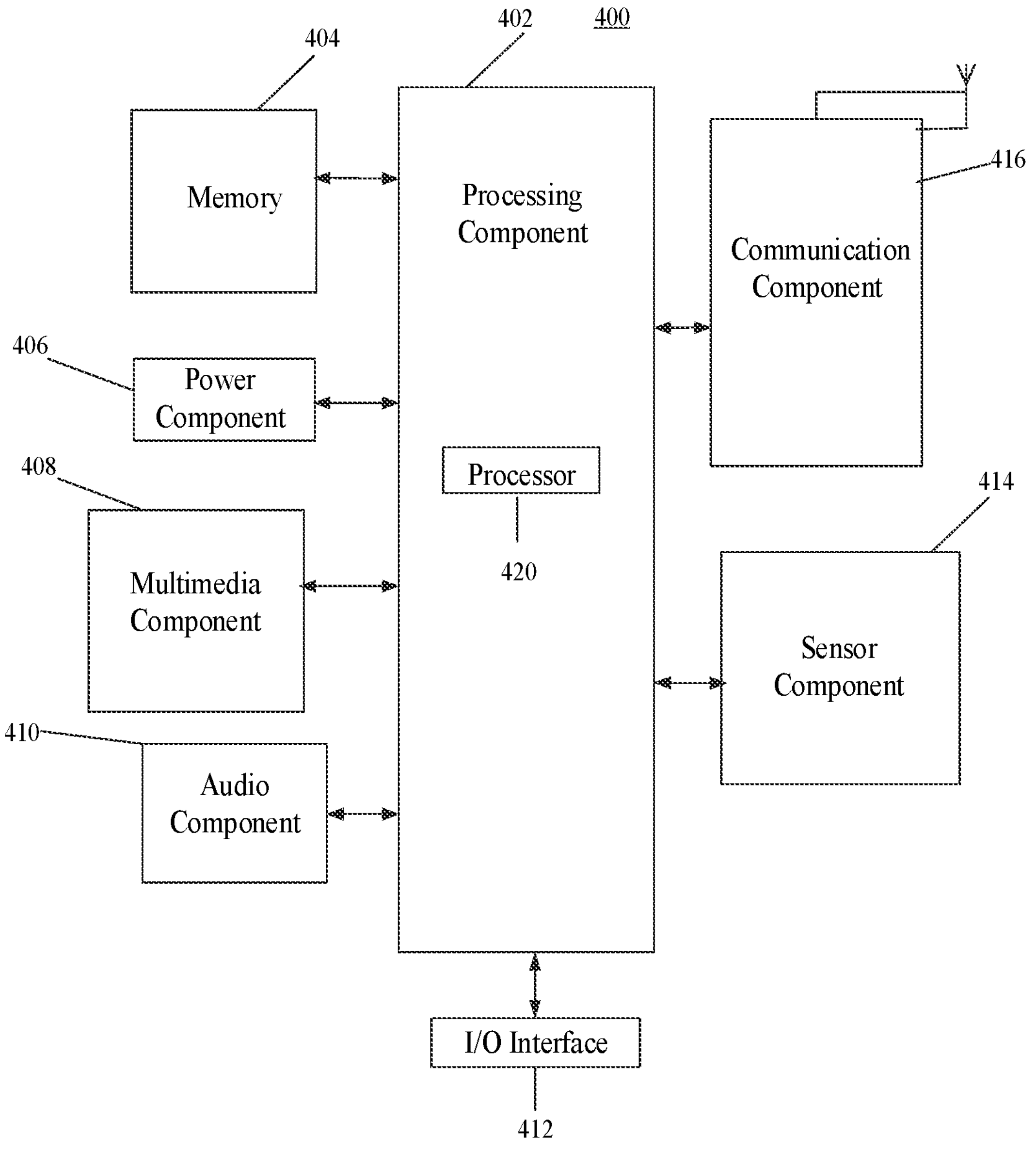
FIG. 8 is a block diagram showing a terminal according to an exemplary embodiment.

Referring to FIG. 8, the terminal 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the terminal 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the terminal 400. Examples of such data include instructions for any applications or methods operated on the terminal 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the terminal 400. The power component 406 may include a power management system, one or more power sources, and any other components associated with the generation, management, and distribution of power in the terminal 400.

The multimedia component 408 includes a screen providing an output interface between the terminal 400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 408 includes a front camera and/or a rear camera. The front camera and the rear camera may receive an external multimedia datum while the terminal 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone ("MIC") configured to receive an external audio signal when the terminal 400 is in an operation mode, such as a call mode, a recording mode, and a voice recognition mode. The received audio signal may be further stored in the memory 404 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the terminal 400. For instance, the sensor component 414 may detect an open/closed status of the terminal 400, relative positioning of components, e.g., the display and the keypad, of the terminal 400, a change in position of the terminal 400 or a component of the terminal 400, a presence or absence of user contact with the terminal 400, an orientation or an acceleration/deceleration of the terminal 400, and a change in temperature of the terminal 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor, or a temperature sensor.

The communication component 416 is configured to facilitate communication, wired or wirelessly, between the terminal 400 and other devices. The terminal 400 can access a wireless network based on a communication standard, such as WiFi, 2G, or 3G, or a combination thereof. In one exemplary embodiment, the communication component 416 receives a broadcast signal or broadcast associated information from an external broadcast management system via a broadcast channel. In one exemplary embodiment, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 404, executable by the processor 420 in the terminal 400, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling brightness of a screen widget for a terminal with a display screen, comprising:

obtaining display data;

determining a widget area of the screen widget based on the display data, wherein the screen widget is configured to display multimedia information in a form of a small window on the display screen; and adjusting brightness of the widget area to a target brightness level;

wherein determining the widget area of the screen widget based on the display data comprises:

determining a row or a column in which frame data of sub-pixel points in the display screen are exactly the same as a target row or a target column based on the display data;

determining frame data of a row or a column adjacent to the target row or target column;

in response to frame data of the row adjacent to the target row being different to frame data of the target row, determining the row adjacent to the target row as a start row or an end row; in response to frame data of the column adjacent to the target column being different to frame data of the target column, determining the column adjacent to the target column as a start column or an end column; and determining an area enclosed by the start row, the end row, the start column, and the end column as the widget area.

2. The method of claim 1, after determining the widget area of the screen widget based on the display data, the method further comprising:

controlling brightness of areas outside the widget area on the display screen such that said brightness of areas outside the widget area remains unchanged.

3. The method of claim 1, wherein adjusting the brightness of the widget area to the target brightness level comprises at least one of:

controlling the brightness of the widget area to be adjusted to the target brightness level according to ambient light information of an environment where the terminal is located;

and, controlling the brightness of the widget area to be adjusted to the target brightness level according to a brightness adjustment instruction received by the display screen.

4. The method of claim 3, wherein adjusting the brightness of the widget area to the target brightness level according to the ambient light information of the environment where the terminal is located comprises:

adjusting the brightness of the widget area to the target brightness level in response to the ambient light information of the environment where the terminal is located being lower than a preset illuminance value.

5. The method of claim 3, wherein adjusting the brightness of the widget area to the target brightness level according to the brightness adjustment instruction received by the display screen comprises:

adjusting the brightness of the widget area to the target brightness level according to the brightness adjustment instruction received by a first preset area of the display screen.

6. The method of claim 1, wherein when the screen widget is a video widget, determining a widget area of the screen widget based on the display data comprises:

determining, based on the display data, change data of sub-pixel points in the widget area when the display screen is refreshed for a preset number of times; and determining the widget area as a video widget area in response to the change data meeting a preset condition.

7. The method of claim 6, wherein determining the widget area as the video widget area in response to the change data meeting the preset condition comprises:

determining the widget area as the video widget area in response to at least one target change row or target change column existed in the change data;

wherein, the target change row or the target change column is a row or column in which the number of sub-pixels whose number of changes exceeds a preset threshold exceeds a preset percentage.

8. The method of claim 6, wherein determining the change data of sub-pixel points in the widget area when the display screen is refreshed for the preset number of times comprises:

when the display screen is refreshed for the preset number of times, in response to data of two adjacent frames of each sub-pixel in the widget area being different, determining that the sub-pixel has changed; and determining position information of each sub-pixel point in the widget area and the number of times the sub-pixel point changes as the change data in case that the sub-pixel point changes.

9. The method of claim 6, further comprising:

determining whether a currently running application is stored in a configuration file;

wherein, an application stored in the configuration file having a video playback function;

determining the widget area as the video widget area based on the display data in response to the currently running application stored in the configuration file.

10. An apparatus for controlling brightness of a screen widget, for a terminal with a display screen, comprising:

one or more processors;

a memory storing instructions executable by the one or more processors;

wherein the one or more processors are configured to:

obtain display data;

determine a widget area of the screen widget based on the display data, wherein the screen widget is configured to display multimedia information in a form of a small window on the display screen; and adjust brightness of the widget area to a target brightness level;

wherein the one or more processors are configured to:

determining a row or a column in which frame data of sub-pixel points in the display screen are exactly the same as a target row or a target column based on the display data;

determining frame data of a row or a column adjacent to the target row or target column;

in response to frame data of the row adjacent to the target row being different to frame data of the target row, determining the row adjacent to the target row as a start row or an end row; in response to frame data of the column adjacent to the target column being different to frame data of the target column, determining the column adjacent to the target column as a start column or an end column; and determining an area enclosed by the start row, the end row, the start column, and the end column as the widget area.

11. The apparatus of claim 10, wherein the one or more processors are further configured to:

control a brightness of areas outside the widget area on the display screen to be remained unchanged.

12. The apparatus of claim 10, wherein the one or more processors are further configured to perform at least one act of:

adjusting the brightness of the widget area to the target brightness level according to ambient light information of an environment where the terminal is located;

and, adjusting the brightness of the widget area to the target brightness level according to a brightness adjustment instruction received by the display screen.

13. The apparatus of claim 12, wherein the one or more processors are further configured to:

adjust the brightness of the widget area to the target brightness in response to the ambient light information of the environment where the terminal is located being lower than a preset illuminance value.

14. The apparatus of claim 12, wherein the one or more processors are further configured to:

control the brightness of the widget area to be adjusted to the target brightness according to the brightness adjustment instruction received by a first preset area of the display screen.

15. The apparatus of claim 10, wherein when the screen widget is a video widget, the one or more processors are configured to:

determine, based on the display data, change data of sub-pixel points in the widget area when the display screen is refreshed for a preset number of times; and determine the widget area as a video widget area in response to the change data meeting a preset condition.

16. The apparatus of claim 15, wherein the one or more processors are further configured to:

determine the widget area as the video widget area in response to at least one target change row or target change column existed in the change data;

wherein, the target change row or the target change column is a row or column in which the number of sub-pixels whose number of changes exceeds a preset threshold exceeds a preset percentage.

17. The apparatus of claim 15, wherein the one or more processors are configured to:

when the display screen is refreshed for the preset number of times, in response to data of two adjacent frames of each sub-pixel in the widget area being different, determine that the sub-pixel has changed; and determine position information of each sub-pixel point in the widget area and the number of times the sub-pixel point changes as the change data in case that the sub-pixel point changes.

18. A non-transitory computer-readable storage medium having stored therein instructions that, when executed by a processor of a terminal, causes the terminal to perform a method for controlling brightness of a screen widget, for a terminal with a display screen, and the method comprises:

obtaining display data;

determining a widget area of the screen widget based on the display data, wherein the screen widget is configured to display multimedia information in a form of a small window on the display screen; and adjusting brightness of the widget area to a target brightness level;

wherein determining the widget area of the screen widget based on the display data comprises:

determining a row or a column in which frame data of sub-pixel points in the display screen are exactly the same as a target row or a target column based on the display data;

determining frame data of a row or a column adjacent to the target row or target column;

in response to frame data of the row adjacent to the target row being different to frame data of the target row, determining the row adjacent to the target row as a start row or an end row; in response to frame data of the column adjacent to the target column being different to frame data of the target column, determining the column adjacent to the target column as a start column or an end column; and determining an area enclosed by the start row, the end row, the start column, and the end column as the widget area.

* * * * *